(12) United States Patent  
Black

(10) Patent No.: US 8,131,772 B2
(45) Date of Patent: Mar. 6, 2012

(54) METHOD AND APPARATUS FOR IMPROVING THE PERFORMANCE OF OBJECT-ORIENTED QUEUES

(75) Inventor: John E. Black, Downingtown, PA (US)

(73) Assignee: Unisys Corporation, Blue Bell, PA (US)

( * ) Notice: Subject to any disclaimer, the term of this patent is extended or adjusted under 35 U.S.C. 154(b) by 284 days.

(21) Appl. No.: 12/631,159

(22) Filed: Dec. 4, 2009

(65) Prior Publication Data

US 2011/0137952 A1    Jun. 9, 2011

(51) Int. Cl.
*G06F 7/00* (2006.01)
(52) U.S. Cl. ...................................................... 707/800
(58) Field of Classification Search ........................ None
See application file for complete search history.

(56) References Cited

U.S. PATENT DOCUMENTS

2008/0098192 A1*   4/2008   Im et al. ...................... 711/170

* cited by examiner

*Primary Examiner* — Truong Vo
(74) *Attorney, Agent, or Firm* — James E. Goepel

(57) ABSTRACT

A method for managing object-oriented queues by reusing queue entry objects instead of creating and destroying each queue entry object inserted into and removed from the queue. Inserting a queue entry object into the queue involves changing the status of the queue entry object from available to in-use, adding the queue entry object to a queue list, returning a reusable queue entry object to the queue user, receiving an insertion notification that the queue entry object data is valid, and marking the insertion of the queue entry object into the queue as complete. Removing a queue entry object from the queue involves un-marking the queue entry object in the queue as complete, removing the queue entry object from the queue list, returning the valid queue entry object to the queue user, receiving a removal notification that valid data has been extracted from the queue entry object, and changing the status of the reusable queue entry object removed from the queue list from in-use to available.

14 Claims, 5 Drawing Sheets

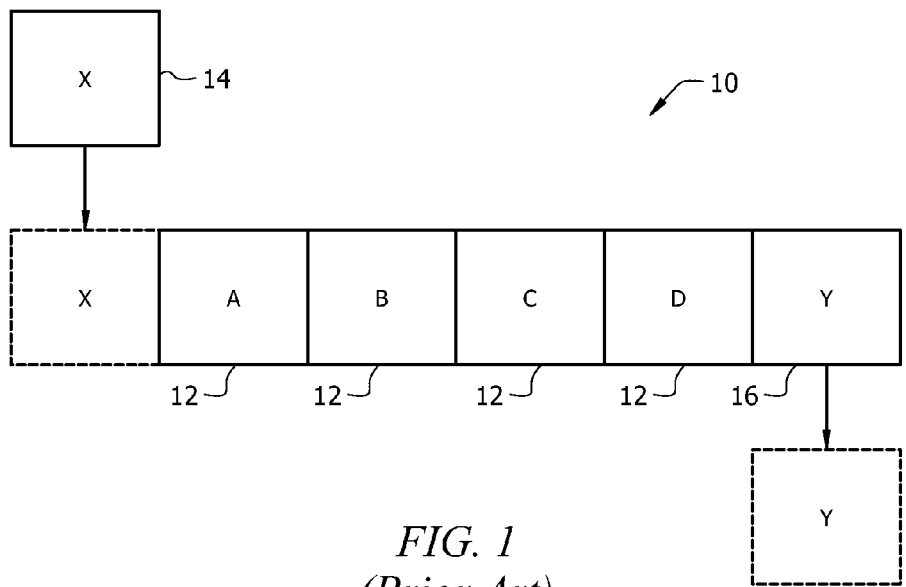
FIG. 1
*(Prior Art)*
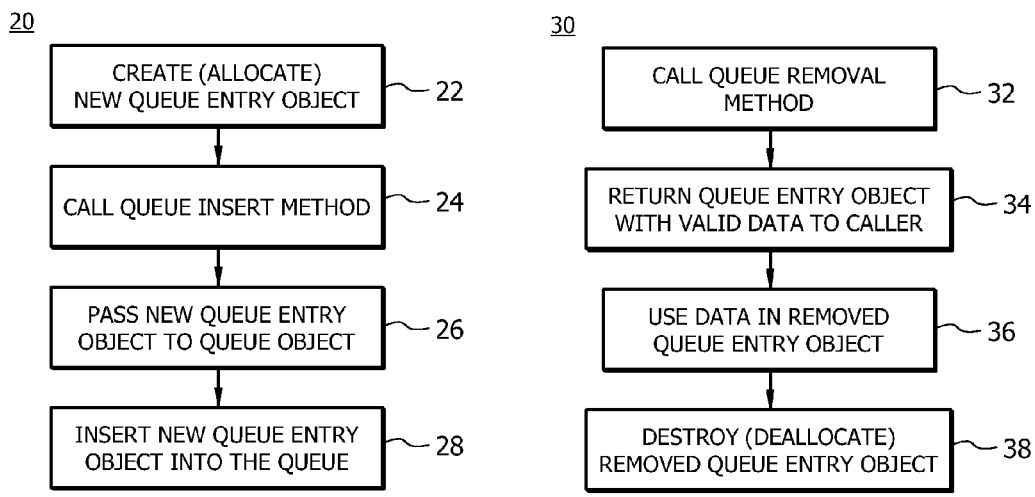
FIG. 2
*(Prior Art)*
FIG. 3
*(Prior Art)*

METHOD AND APPARATUS FOR IMPROVING THE PERFORMANCE OF OBJECT-ORIENTED QUEUES

BACKGROUND

1. Field

The instant disclosure relates generally to object-oriented queues, and more particularly, to reducing the processing resource overhead involved in managing object-oriented queues.

2. Description of the Related Art

A program object is a data structure that includes data fields and one or more methods or procedures for adding, deleting or otherwise manipulating the data in the program object. When managing the processing of program objects, e.g., in object-oriented programming (OOP), there often is a need to keep program objects in a queue, e.g., as queue entry objects. A queue is any suitable type of ordered collection of entries, such as a LIFO (last in, first out) queue or a FIFO (first in, first out) queue. In many object-oriented programming applications, a queue is implemented as a queue object that generally defines the structure of the queue and provides the methods or procedures for operating the queue, including the operations of adding queue entry objects to the queue and removing queue entry objects from the queue.

Conventionally, when managing object-oriented (OO) queues, queue entry objects are inserted into the queue first by creating (i.e., allocating) a new queue entry object and then calling (or executing) an appropriate method within the queue object to insert the new queue entry object into the queue. To remove a queue entry object from the queue, another method within the queue object is called or executed to remove the queue entry object from the queue and to return the queue entry object to the caller. In such conventional queue management processing, once the queue entry object has been removed from the queue and used by the caller, the queue entry object is destroyed (i.e., deallocated). The creation and destruction of queue entry objects inserted into and deleted from a queue in this manner often results in relatively significant processing overhead, especially for processes in which a major portion of the process involves inserting queue entry objects into a queue and removing queue entry objects from a queue.

SUMMARY

Disclosed is a method and apparatus for managing object-oriented queues, such as queues in object-oriented programming, in a manner that reduces processing overhead associated with inserting queue entry objects into the object-oriented queue and removing queue entry objects from the object-oriented queue. Instead of creating each queue entry object that is to be inserted into the queue and destroying each queue entry object after it is removed from the queue, the queue entry objects are reused by the queue object and the user of the queue. Prior to using the queue, a queue entry object of the type to be used in the queue can be provided to the queue object and copies of the queue entry object can be made within the queue object. The methods for managing the queue include inserting a queue entry object into the queue in response to a queue user calling a queue insert method, and removing a queue entry object from the queue in response to a queue user calling a queue removal method. The insertion portion of the method includes adding to a queue list a reference or other indicia of the queue entry object to be inserted into the queue, changing the status of the queue entry object added to the queue list from an available queue entry object to an in-use queue entry object, returning a reusable queue entry object to the queue user, receiving an insertion notification from the queue user when the queue entry object is a valid queue entry object having valid data entered therein by the queue user, and marking in the queue list the insertion of the valid queue entry object into the queue as complete. The removal portion of the method includes un-marking in the queue list as complete a queue entry object to be removed from the queue, removing from the queue list a reference or other indicia of the queue entry object to be removed from the queue, returning a valid queue entry object to be removed from the queue to the queue user, receiving from the queue user a removal notification when the queue entry object has had its valid data extracted therefrom, and changing the status of the reusable queue entry object removed from the queue list from an in-use queue entry object to an available queue entry object.

BRIEF DESCRIPTION OF THE DRAWINGS

FIG. 1 is a schematic view of a queue, such as an object-oriented (OO) queue, illustrating the insertion of a queue entry object into the queue and the removal of a queue entry object from the queue;

FIG. 2 is a flow diagram of a method for inserting a queue entry object into an object-oriented queue according to conventional processes;

FIG. 3 is a flow diagram of a method for removing a queue entry object from an object-oriented queue according to conventional processes;

DETAILED DESCRIPTION

Figure 4:
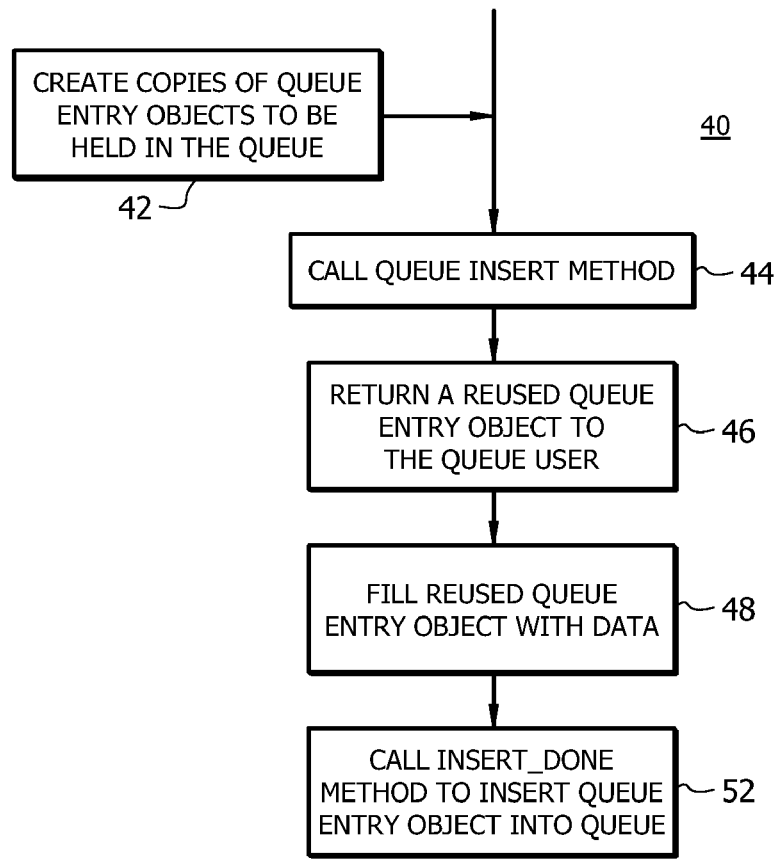
FIG. 4 is a flow diagram of a method for inserting a queue entry object into an object-oriented queue, according to an embodiment.

In the following description, like reference numerals indicate like components to enhance the understanding of the disclosed method and apparatus for improving the management of queues through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the disclosure.

FIG. 1 is a schematic view of a queue 10, such as object-oriented (OO) queue or other suitable queue. The queue 10 can be any suitable type of ordered collection of entries, such as a LIFO (last in, first out) queue or a FIFO (first in, first out) queue. The queue 10 can include one or more queue entries or queue entry objects 12, e.g., queue entry objects A-D, arranged in a particular order, e.g., depending on when the queue entry objects were inserted into the queue 10.

As is conventional in queuing processes, a new queue entry object 14, e.g., a queue entry object X, can be added to the queue 10, e.g., as shown. Typically, a queue stores queue entry objects at the tail or end of the queue, and in the order in which the queue entry objects are added to the queue. The queue 10 also can have an existing queue entry object 16, e.g., a queue entry object Y, removed from the queue 10. The queue entry object that is removed from the queue 10 is based on the configuration of the queue, e.g., whether the queue 10 is a LIFO queue, in which case the last queue entry object added to the tail of the queue is removed first, or a FIFO queue, in which case the first or earliest queue entry object added to the queue is removed first. Alternatively, the queue 10 can be configured to remove a specific queue entry object occupying a specific position in the queue.

FIG. 2 is a flow diagram of a method 20 for inserting a queue entry, e.g., a queue entry object, into an object-oriented (OO) queue, according to conventional processes. The method 20 includes a step 22 of creating or allocating a new queue entry object. Initially, a user of the queue creates (allocates) a new queue entry object to be inserted into the queue. The created queue entry object includes data supplied by the queue user, and appropriate structure and methods for manipulating the data within the queue entry object. As in conventional object-oriented applications, the data structure and methods within the queue entry object are self-contained and independent of the queue structure and the methods within the queue object that operate the queue.

The method 20 also includes a step 24 of calling a queue insert method. Once the queue user has created the new queue entry object, the queue user (caller) calls the queue insert method, which typically is located within or otherwise part of the queue object. As discussed hereinabove, in many object-oriented programming applications, the queue object includes data structures that define the structure of the queue and also includes the methods or procedures for operating the queue.

The method 20 also includes a step 26 of passing the new queue entry object to the queue object. Once the queue user has created the new queue entry object and called the insert method, the insert method passes the new queue entry object as its parameter from the queue user (caller) to the queue object.

The method 20 also includes a step 28 of inserting the new queue entry object into the queue. After the insert method has passed the new queue entry object to the queue object, the queue object inserts the new queue entry object into the queue, e.g., at the tail or end of the queue.

FIG. 3 is a flow diagram of a method 30 for removing a queue entry object from an object-oriented queue, according to conventional processes. The method 30 includes a step 32 of calling a queue entry object removal method. When a queue entry object is to be removed from the queue, e.g., as directed by the queue user or some process external to the queue, the queue user (caller) calls the queue removal method, which typically is located within or otherwise is a part of the queue object.

The method 30 also includes a step 34 of returning a queue entry with valid data to the caller. In response to the caller calling the queue entry object removal method within the queue object, the called queue entry object removal method returns an appropriate queue entry object from the queue to the caller. As discussed hereinabove, for a LIFO queue, the last queue entry object added to the tail of the queue is removed first and therefore would be the queue entry object returned to the caller. If the queue is a FIFO queue, the first or earliest queue entry object added to the queue is removed and returned to the caller.

The method 30 also includes a step 36 of using the data in the removed queue entry object. Once the particular queue entry object has been removed from the queue to the caller by the queue entry object removal method, the removed queue entry object and its data therein is used by the caller for its desired purpose.

The method 30 also includes a step 38 of destroying or deallocating the removed queue entry object. Once the queue entry object has been removed from the queue and the caller has used the removed queue entry object and its data for the desired purpose, the caller or some subsequent automatic or manual memory garbage collection action destroys (deallocates) the removed queue entry object. In this manner, the removed queue entry object ceases to exist and may not be used again.

As discussed previously hereinabove, the processing overhead involved in both creating (allocating) a new queue entry object prior to insertion into the queue and destroying (deallocating) a used queue entry object after removal from the queue may be a relatively significant portion of the overall processing overhead, especially for system processes in which a major portion of the process involves queue insertion and queue removal of queue entry objects. However, unlike conventional object-oriented queue methods that create (allocate) each new queue entry object that is inserted into the queue and destroy (deallocate) each queue entry object that is removed from the queue, the inventive methods described in greater detail hereinbelow reuse existing queue entry objects in the queue. By reusing the queue entry objects in the queue, such inventive methods eliminate the overhead associated with the recurring creation (allocation) of new queue entry objects for insertion into the queue and the subsequent destructions (deallocation) of the queue entry objects removed from the queue according to conventional configurations and arrangements.

FIG. 4 is a flow diagram of a method 40 for inserting a queue entry object into an object-oriented queue, according to an embodiment. Prior to the first use of the insertion method 40, e.g., during the initial creation of the queue, a step 42 is performed in which the queue object is supplied with a queue entry object of the type the queue will contain and the queue object creates a sufficient number of copies of the queue entry object to represent the queue entry objects that will be held in the queue. In this manner, the queue entry objects in the queue are created only once. Also, the queue entry objects will be destroyed only when the queue itself (and its queue object) is destroyed. Additional copies of the queue entry object may be created or destroyed by the queue object during the subsequent normal operation of the queue. However, the creation and destruction of queue entry objects is not a direct consequence of inserting queue entry objects into the queue or removing queue entry objects from the queue.

Figure 5:
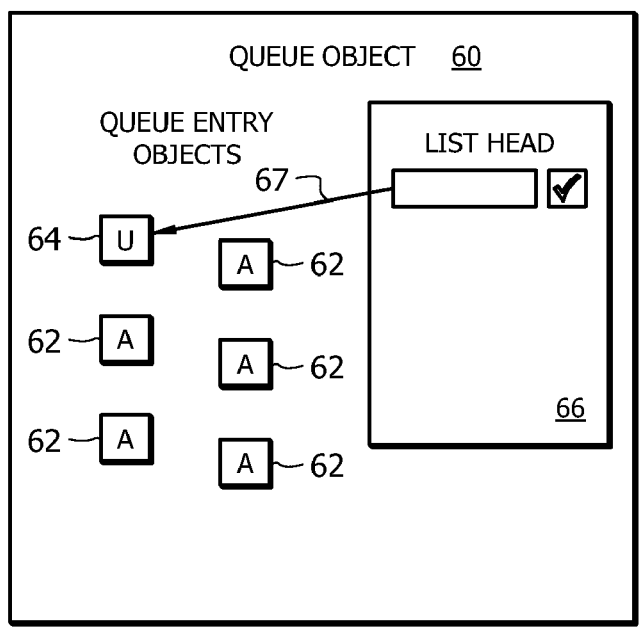
FIG. 5 is a schematic view of a queue object within an object-oriented queue, according to an embodiment.

FIG. 5 is a schematic view of a queue object 60 associated with or corresponding to an object-oriented queue, according to an embodiment. The queue object 60 includes a plurality of queue entry objects 62 that are available (A) for use, which are the result of the step 42 of supplying the queue object 60 with the queue entry object of the type the queue will contain.

Also, at any given time, e.g., during the normal operation of the queue, the queue object 60 can include one or more queue entry objects 64 that are in use (U), i.e., that are in the queue. As will be discussed in greater detail hereinbelow, of the queue entry objects 64 that are in use (U), each of the in-use queue entry objects can be in use and accessible, or in use but inaccessible. Moreover, in the example queue object 60 shown, one or more of the available queue entry objects could have been previously in use, but now is available for reuse by the queue.

The queue object 60 also includes a queue list 66 that keeps track of the queue entry objects in the queue, as well as the status or state of each of the queue entry objects in the queue. The queue list 66 also keeps track of when the insertion of a queue entry object into the queue is complete and when the removal of a queue entry object from the queue is complete. For example, as shown generally by an arrow 67, one of the queue entry objects 64 is shown as being in the queue and the insertion of the queue entry object into the queue is marked or checked as complete. That is, the queue entry object 64 is in use and accessible, e.g., by a queue user.

The queue entry object insertion method 40 includes a step 44 of calling a queue insert method. When a queue user wants to initiate the insertion of a queue entry object into the queue object 60, the queue user (caller) calls a queue insert method within the queue object 60. As part of the step 44 of the insert method being called, the queue object 60 selects an available queue entry object 62 that is to be used, i.e., the available queue entry object that will be reused and inserted into the queue. The selected queue entry object is added to the queue list 66 and marked as in-use 64.

Figures 6, 7:
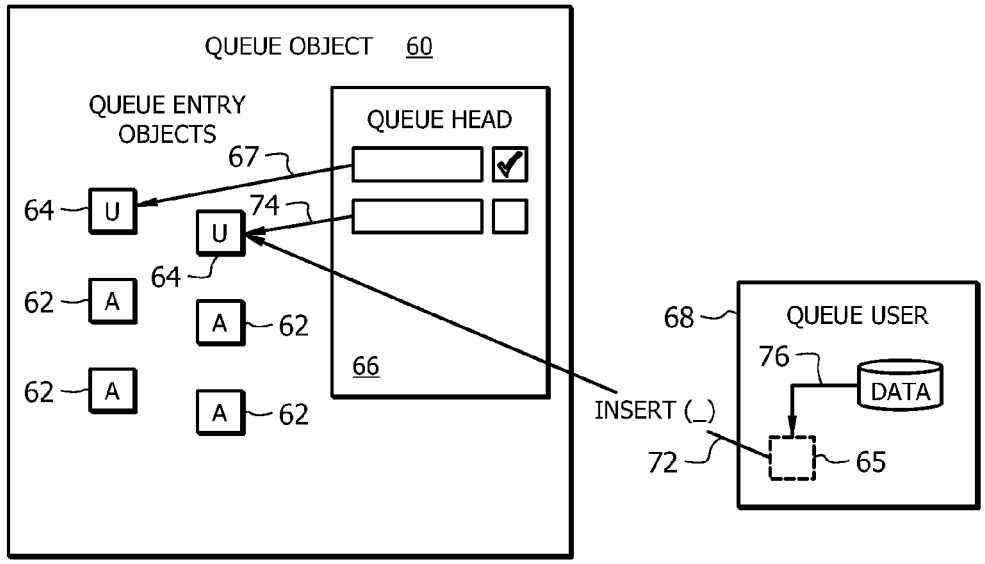
FIG. 6 is a schematic view of the queue object of FIG. 5, illustrating a first portion of inserting a queue entry object into the queue, according to an embodiment.
FIG. 7 is a schematic view of the queue object of FIG. 5, illustrating a second portion of inserting a queue entry object into the queue, according to an embodiment.

FIG. 6 is a schematic view of the queue object 60, illustrating a first portion of the process for inserting a queue entry object into the queue, according to an embodiment. As shown generally by an arrow 72, a queue user 68 calls a queue insert method, e.g., INSERT (_), within the queue object 60. The queue insert method selects an available queue entry object and adds to the queue list 66, e.g., at the bottom of the queue list 66, an indicia or other reference index of the particular available queue entry object. The addition of the queue entry object reference or index to the queue list 66 is shown generally by an arrow 74. In this particular example, the queue list 66 now has two queue entries. The called insert method then marks or changes the status of the particular queue entry object from available (A) to in use (U). At this point, the status of the particular queue entry object that has been added to the queue list 66 is in-use (U) but inaccessible, which means that the queue object prevents any other access to the queue entry object. The queue entry object added to the queue list 66 is in use because the queue entry object now is in the queue list 66, but inaccessible because the queue entry object is not yet a valid queue entry object because the queue entry object has not yet been filled with valid data.

The method 40 includes a step 46 of returning a reused queue entry object to the queue user or caller. In addition to the insert method adding a reference or index of the particular available queue entry object to the queue list 66, the insert method returns the queue entry object to the queue user 68, i.e., the caller of the insert method. The returned reference to the queue entry object is shown generally as a reused queue entry object 65. It should be understood that the queue entry object 65 is referred to as a reused queue entry object because the queue entry object likely has been in use before and now is available for use again, thus the queue entry object is being reused.

The method 40 includes a step 48 of filling the reused queue entry object with valid data. Upon receiving the reused queue entry object 65, the queue user then fills or stores desired data into the reused queue entry object 65, e.g., by setting the values of appropriate data fields within the reused queue entry object 65. The queue user filling or storing desired data into the queue entry object 65 is shown generally by an arrow 76.

The method 40 also includes a step 52 that completes the insertion of the queue entry object into the queue. Once the queue user has filled the reused queue entry object with valid data, the queue user calls an insert completion method, e.g., INSERT_DONE (_), within the queue object 60. In general, the insert completion method informs the queue object 60, with a notification or insertion notification, that the queue entry object now contains valid data and that the insertion of the queue entry object into the queue therefore is complete.

FIG. 7 is a schematic view of the queue object 60, illustrating a second portion of the process for inserting a queue entry object into the queue, according to an embodiment. As shown generally by an arrow 78, the insert completion method marks or otherwise indicates in the queue list 66 the insertion of the queue entry object 64 into the queue as complete. The insert completion method also changes the status of the queue entry object from "in use but inaccessible" to "in use and accessible" because the queue entry object still is in use but now has valid data therein. At this point, the reused queue entry object is a valid queue entry object and has been inserted into the queue.

Figure 8:
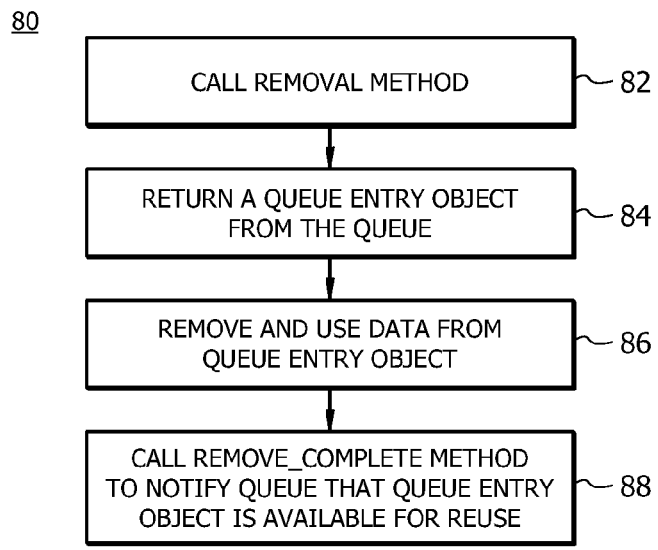
FIG. 8 is a flow diagram of a method for removing a queue entry object from an object-oriented queue, according to an embodiment.

FIG. 8 is a flow diagram of a method 80 for removing a queue entry object from an object-oriented queue, according to an embodiment. As discussed hereinabove, conventional queue management processes destroy (deallocate) a queue entry object removed from the queue after the queue entry object no longer is needed, e.g., after the data has been extracted from the queue entry object. However, as discussed in greater detail hereinbelow, in the inventive queue management process, queue entry objects are not destroyed after they have been removed from the queue and their data extracted. Rather, the queue entry objects subsequently are reused by the queue object in future queue management processes.

The method 80 includes a step 82 of calling a queue removal method. When the queue user wants to initiate the removal of a queue entry object from the queue, e.g., from the head of the queue, the queue user (caller) calls a queue removal method within the queue object 60. As part of the step 82 of the queue removal method being called within the queue object 60, the queue object 60 returns to the queue user a reference to a particular queue entry object from the queue, e.g., the queue entry object at the head of the queue.

Figure 9:
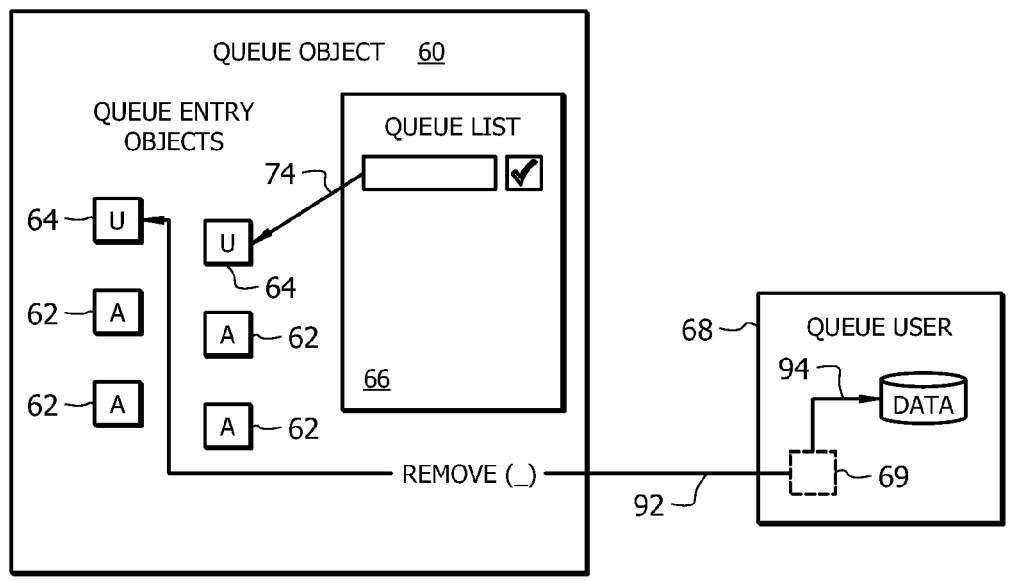
FIG. 9 is a schematic view of the queue object of FIG. 7, illustrating a first portion of removing a queue entry object from the queue, according to an embodiment.

FIG. 9 is a schematic view of the queue object 60, illustrating a first portion of the process for removing a queue entry object from the queue, according to an embodiment. As shown generally by an arrow 92, the queue user 68 calls a queue removal method, e.g., REMOVE (_), within the queue object 60. The queue removal method un-marks in the queue list 66 as complete the particular queue entry object to be removed from the queue. The queue removal method also removes the particular queue entry object from the queue list 66, e.g., at the top of the queue list 66. In this particular example, the queue list 66 now has one remaining queue entry.

The method 80 also includes a step 84 of returning the removed queue entry object to the caller, i.e., the queue user. In addition to the removal method removing the particular queue entry object from the queue list 66, the removal method returns a reference to the particular queue entry object to the queue user 68. The particular queue entry object being returned to the queue user is shown generally as a removed queue entry object 69. It should be understood that the removed queue entry object 69 still includes valid data for use by the queue user. However, the status of the queue entry object is now "in-use but inaccessible," because the queue entry object has been removed from the queue but still has valid data therein for extraction by the queue user.

The method 80 also includes a step 86 of extracting valid data from the queue entry object removed from the queue and returned to the queue user 68. Upon receiving the particular queue entry object removed from the queue, the queue user extracts valid data from the particular queue entry object, e.g., the values of appropriate data fields within the particular queue entry object are used or copied. The queue user extracting and using the valid data from the removed queue entry object 69 is shown generally by an arrow 94.

The method 40 also includes a step 88 of making the removed queue entry object available for reuse. Once the queue user has extracted or otherwise used the valid data from the queue entry object removed from the queue, the queue user calls a removal completion method, e.g., REMOVE_DONE (_), within the queue object 60. In general, the removal completion method informs the queue object 60, with a notification or removal notification, that the queue entry object now is available for reuse by the queue and that the removal of the queue entry object from the queue therefore is complete.

Figure 10:
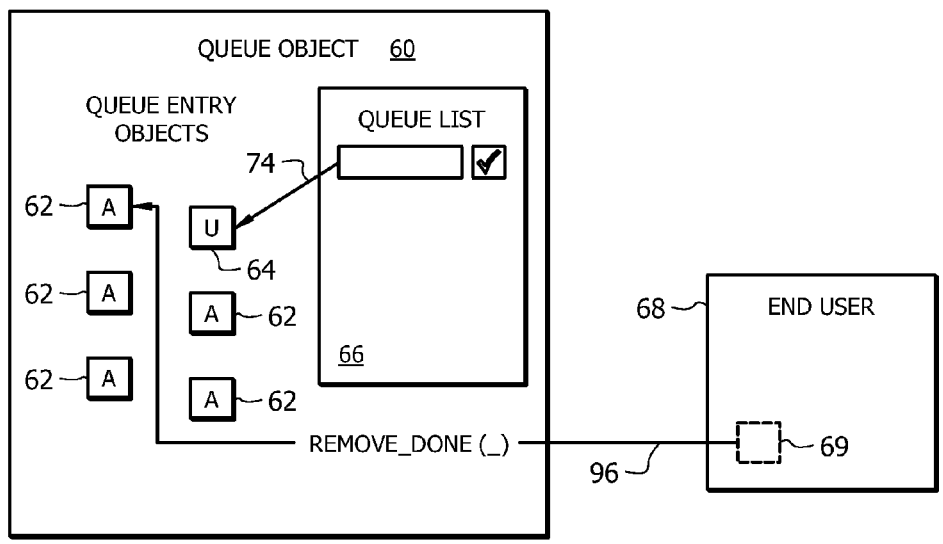
FIG. 10 is a schematic view of the queue object of FIG. 7, illustrating a second portion of removing a queue entry object from the queue, according to an embodiment.

FIG. 10 is a schematic view of the queue object 60, illustrating a second portion of the process for removing a queue entry object from the queue, according to an embodiment. The removal completion method notifies the queue object 60 that the queue entry object now is available for reuse. As shown generally by an arrow 96, the removal completion method marks the queue entry object as available (A) for reuse. At this point, the reused queue entry object has been removed from the queue and now is a queue entry object available for reuse.

It should be understood that the queue management methods described herein can be used in a multitasking environment by adding the appropriate mutual exclusion mechanisms in the queue object methods. That is, it should be understood that the queue management methods described herein can be made to be thread safe.

Also, it should be understood that the queue management methods described herein can accommodate any number of queue entry objects in the queue at a given time by adding the appropriate mechanisms to the queue object to increase or decrease the number of reusable queue entry objects as necessary.

Also, it should be understood that the queue management methods described herein can be performed partially or completely within any suitable computing environment having the processing capability to execute or perform such queue management methods. For example, the methods described herein can be performed partially or completely within any apparatus or device having a processor or controller with suitable queue management computing capabilities.

Figure 11:
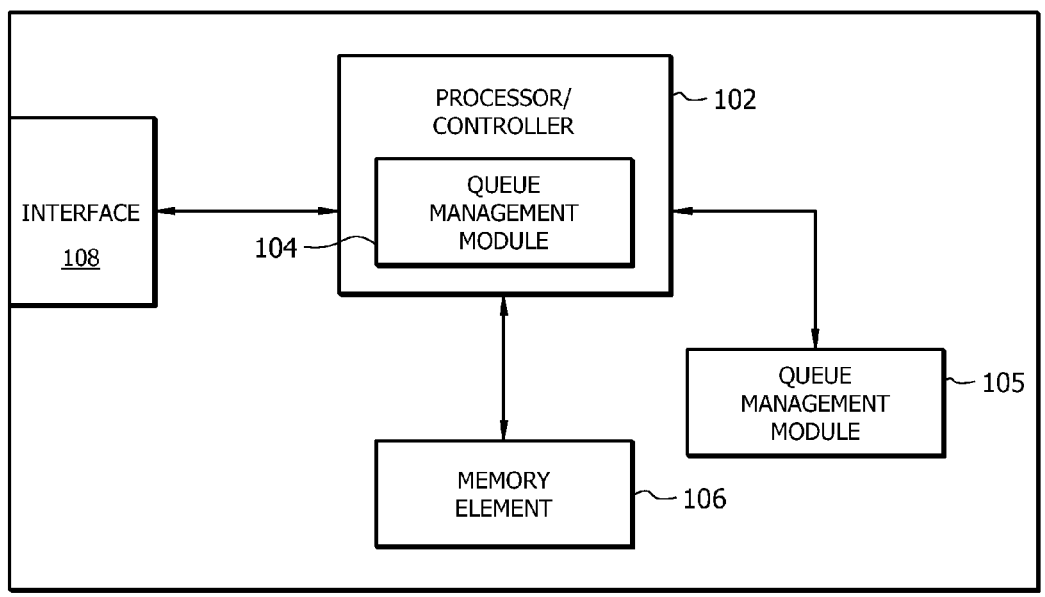
FIG. 11 is a schematic view of an apparatus configured to manage queues, such as object-oriented queues, according to an embodiment.

FIG. 11 is a schematic view of an apparatus 100 configured to manage queues, such as object-oriented queues, according to an embodiment. The apparatus 100 can be any apparatus, device or computing environment suitable for managing queues. For example, the apparatus 100 can be or be contained within any suitable computer system, including a mainframe computer and/or a general or special purpose computer.

The apparatus 100 includes one or more general purpose (host) controllers or processors 102 that, in general, processes instructions, data and other information received by the apparatus 100. The processor 102 also manages the movement of various instructional or informational flows between various components within the apparatus 100. The processor 102 can include a queue management module 104 that is configured to execute and perform the queue management processes described herein, such as adding queue entry objects to the queue and removing queue entry objects from the queue. Alternatively, the apparatus can include a stand alone queue management module 105 coupled to the processor 102.

The apparatus 100 also can include a memory or content storage element 106, coupled to the processor 102, for storing instructions, data and other information received and/or created by the apparatus 100. In addition to the memory element 106, the apparatus 100 can include at least one type of memory or memory unit (not shown) within the processor 102 for storing processing instructions and/or information received and/or created by the apparatus 100.

The apparatus 100 also can include one or more interfaces 108 for receiving instructions, data and other information. It should be understood that the interface 108 can be a single input/output interface, or the apparatus 100 can include separate input and output interfaces.

One or more of the processor 102, the queue management module 104, the queue management module 105, the memory element 106 and the interface 108 can be comprised partially or completely of any suitable structure or arrangement, e.g., one or more integrated circuits. Also, it should be understood that the apparatus 100 includes other components, hardware and software (not shown) that are used for the operation of other features and functions of the apparatus 100 not specifically described herein.

The apparatus 100 can be partially or completely configured in the form of hardware circuitry and/or other hardware components within a larger device or group of components. Alternatively, the apparatus 100 can be partially or completely configured in the form of software, e.g., as processing instructions and/or one or more sets of logic or computer code. In such configuration, the logic or processing instructions typically are stored in a data storage device, e.g., the memory element 106 or other suitable data storage device (not shown). The data storage device typically is coupled to a processor or controller, e.g., the processor 102. The processor accesses the necessary instructions from the data storage element and executes the instructions or transfers the instructions to the appropriate location within the apparatus 100.

The methods illustrated in FIGS. 4-10 may be implemented in a general, multi-purpose or single purpose processor. Such a processor will execute instructions, either at the assembly, compiled or machine-level, to perform that process. Those instructions can be written by one of ordinary skill in the art following the description of FIGS. 4-10 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), and the like.

It will be apparent to those skilled in the art that many changes and substitutions can be made to the embodiments described herein without departing from the spirit and scope of the disclosure as defined by the appended claims and their full scope of equivalents.

The invention claimed is:

1. A method for managing a queue of reusable object-oriented queue entry objects, the method comprising:
    inserting an object-oriented queue entry object into the queue in response to a queue user calling a queue insert method, wherein the inserting includes
        adding to a queue list an indicia of a queue entry object to be inserted into the queue,
        changing the status of the queue entry object to be inserted into the queue from available queue entry object to in-use queue entry object,
        returning the queue entry object to be inserted into the queue to the queue user, wherein the queue entry object to be inserted into the queue has invalid data therein,
        receiving an insertion notification from the queue user when the queue entry object to be inserted into the queue is a valid queue entry object having valid data entered therein by the queue user, and
        marking in the queue list as complete the insertion of the valid queue entry object into the queue; and
    removing an object-oriented queue entry object from the queue in response to a queue user calling a queue removal method, wherein the removing includes
        un-marking in the queue list as complete a queue entry object to be removed from the queue,
        removing from the queue list an indicia of the queue entry object to be removed from the queue,
        returning the queue entry object to be removed from the queue to the queue user, wherein the queue entry object removed from the queue has valid data therein,
        receiving a removal notification from the queue user when the queue entry object to be removed from the queue has had its valid data extracted by the queue user, and
        changing the status of the queue entry object removed from the queue from in-use queue entry object to available queue entry object.

2. The method as recited in claim 1, further comprising generating a plurality of reusable queue entry objects for insertion into the queue and removal from the queue.

3. The method as recited in claim 2, wherein generating the plurality of reusable queue entry objects includes providing a reusable queue entry object of the type to be inserted into the queue and removed from the queue and making at least one copy of the provided reusable queue entry object.

4. The method as recited in claim 1, wherein inserting the queue entry object into the queue includes calling an INSERT_DONE method, and wherein marking the insertion of the valid queue entry object into the queue as complete is performed in response to calling the INSERT_DONE method.

5. The method as recited in claim 1, wherein removing the queue entry object from the queue includes calling a REMOVE_DONE method, and wherein changing the status of the reusable queue entry object removed from the queue list from in-use queue entry object to available queue entry object is performed in response to calling the REMOVE_DONE method.

6. The method as recited in claim 1, wherein the queue entry object to be inserted into the queue has a plurality of data fields and wherein the queue user enters valid data into the queue entry object to be inserted into the queue by setting the values of at least one data field in the queue entry object to be inserted into the queue.

7. The method as recited in claim 1, wherein the queue entry object to be removed from the queue has a plurality of data fields and wherein the queue user extracts valid data from the queue entry object to be removed from the queue by reading or copying the values of the data fields in the queue entry object to be removed from the queue.

8. The method as recited in claim 1, wherein the queue has a queue object associated therewith, and wherein at least one of the queue insert method, the queue removal method and the queue list is included in the queue object.

9. The method as recited in claim 1, wherein the queue has a head end and a tail end, wherein queue entry objects are inserted into the queue at the tail end of the queue, and wherein queue entry objects are removed from the queue at the head end of the queue.

10. The method as recited in claim 1, wherein the queue has a head end and a tail end, wherein queue entry objects are inserted into the queue at the tail end of the queue, and wherein queue entry objects are removed from the queue at the tail end of the queue.

11. An apparatus for managing a queue of reusable object-oriented queue entry objects, comprising:
    a controller configured to receive queue entry object insertion instructional information and queue entry object removal instructional information from a queue user;
    a memory element coupled to the controller for storing at least a portion of the instructional information received by the controller; and
    a queue management module coupled to the controller,
    wherein the queue management module is configured to insert an object-oriented queue entry object into the queue in response to a queue user calling a queue insert method, wherein inserting the object-oriented queue entry into the queue includes
        adding to a queue list an indicia of a queue entry object to be inserted into the queue,
        changing the status of the queue entry object to be inserted into the queue from available queue entry object to in-use queue entry object,
        returning the queue entry object to be inserted into the queue to the queue user, wherein the queue entry object to be inserted into the queue has invalid data therein,
        receiving an insertion notification from the queue user when the queue entry object to be inserted into the queue is a valid queue entry object having valid data entered therein by the queue user, and
        marking in the queue list as complete the insertion of the valid queue entry object into the queue; and
    wherein the queue management module is configured to remove an object-oriented queue entry object from the queue in response to a queue user calling a queue removal method, wherein removing the object-oriented queue entry from the queue includes
        un-marking in the queue list as complete a queue entry object to be removed from the queue,
        removing from the queue list an indicia of the queue entry object to be removed from the queue,
        returning the queue entry object to be removed from the queue to the queue user, wherein the queue entry object removed from the queue has valid data therein,
        receiving a removal notification from the queue user when the queue entry object to be removed from the queue has had its valid data extracted by the queue user, and
        changing the status of the queue entry object removed from the queue from in-use queue entry object to available queue entry object.

12. The apparatus as recited in claim 11, wherein the queue management module is configured to generate a plurality of reusable queue entry objects for insertion into the queue and removal from the queue, wherein the queue management module generates the plurality of queue entry objects by receiving a reusable queue entry object of the type to be inserted into the queue and removed from the queue and making at least one copy of the received reusable queue entry object.

13. A computer readable medium having instructions stored thereon that, when executed by a processor, carry out a method for managing a queue of reusable object-oriented queue entry objects, the instructions comprising:

instructions for inserting an object-oriented queue entry object into the queue in response to a queue user calling a queue insert method, wherein the inserting includes instructions for adding to a queue list an indicia of a queue entry object to be inserted into the queue, instructions for changing the status of the queue entry object to be inserted into the queue from available queue entry object to in-use queue entry object, instructions for returning the queue entry object to be inserted into the queue to the queue user, wherein the queue entry object to be inserted into the queue has invalid data therein, instructions for receiving an insertion notification from the queue user when the queue entry object to be inserted into the queue is a valid queue entry object having valid data entered therein by the queue user, and instructions for marking in the queue list as complete the insertion of the valid queue entry object into the queue; and instructions for removing an object-oriented queue entry object from the queue in response to a queue user calling a queue removal method, wherein the removing includes instructions for un-marking in the queue list as complete a queue entry object to be removed from the queue, instructions for removing from the queue list an indicia of the queue entry object to be removed from the queue, instructions for returning the queue entry object to be removed from the queue to the queue user, wherein the queue entry object removed from the queue has valid data therein, instructions for receiving a removal notification from the queue user when the queue entry object to be removed from the queue has had its valid data extracted by the queue user, and instructions for changing the status of the queue entry object removed from the queue from in-use queue entry object to available queue entry object.

14. The computer readable medium as recited in claim 13, further comprising instructions for generating a plurality of reusable queue entry objects for insertion into the queue and removal from the queue, wherein the generating instructions include instructions for providing a reusable queue entry object of the type to be inserted into the queue and removed from the queue and instructions for making at least one copy of the provided reusable queue entry object.

* * * * *